J. J. PRENDERGAST.
EXCAVATING APPARATUS.
APPLICATION FILED SEPT. 18, 1908.
945,414.
Patented Jan. 4, 1910.
3 SHEETS—SHEET 2.
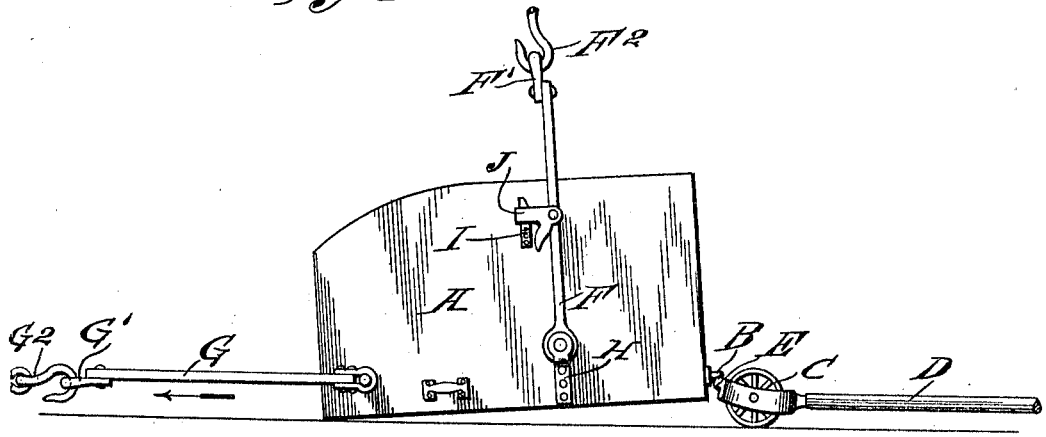
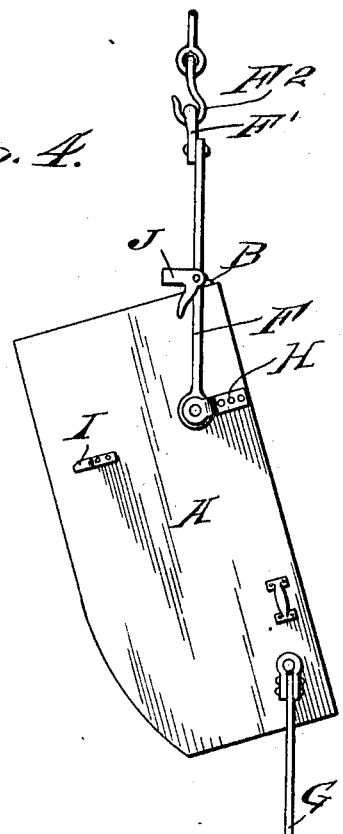
Witnesses.
Inventor.
Jeffrey J. Prendergast.
By Bruce A. Elliott
atty.

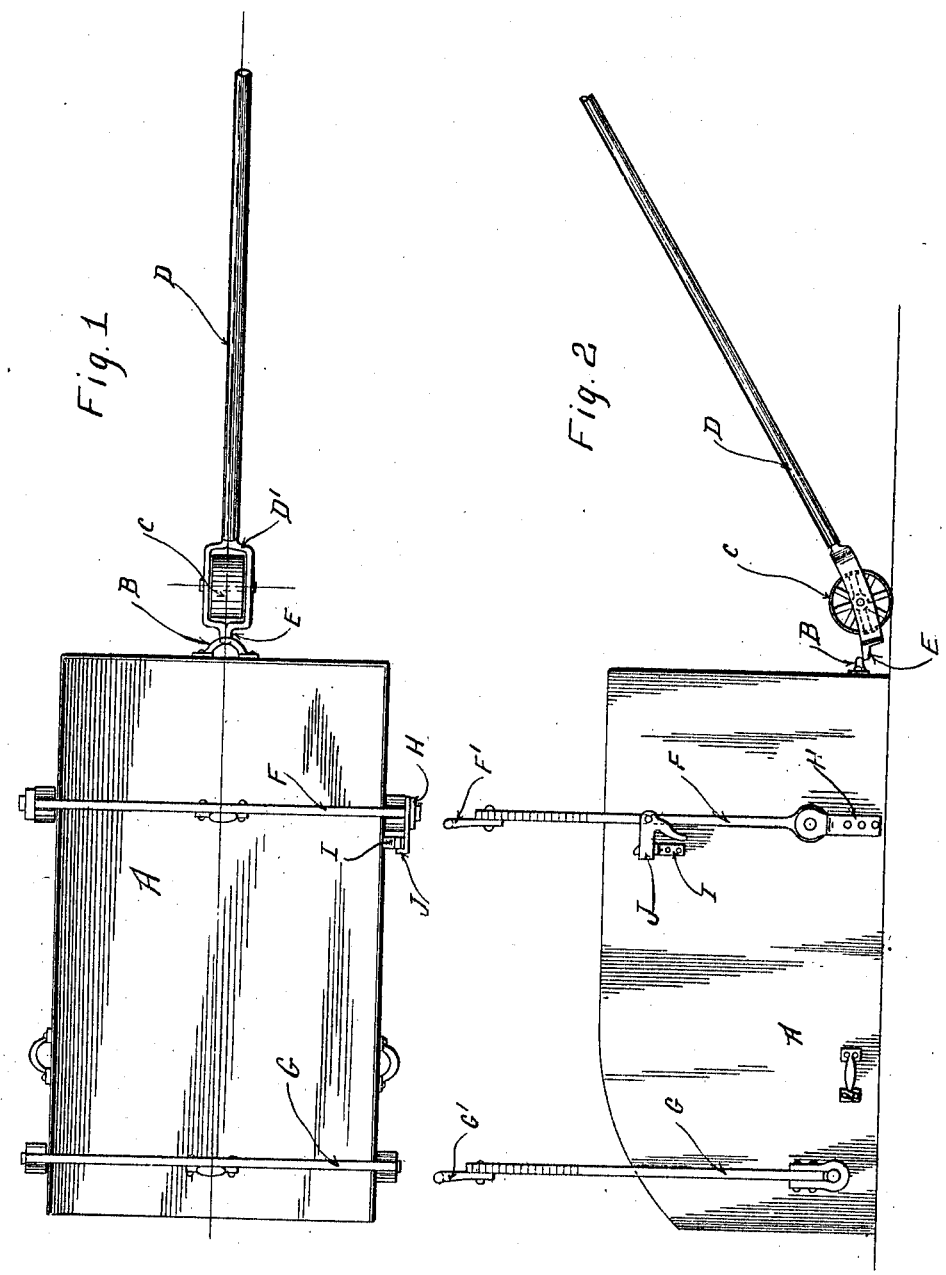

J. J. PRENDERGAST.
EXCAVATING APPARATUS.
APPLICATION FILED SEPT. 18, 1908.
945,414.
Patented Jan. 4, 1910.
3 SHEETS—SHEET 3.
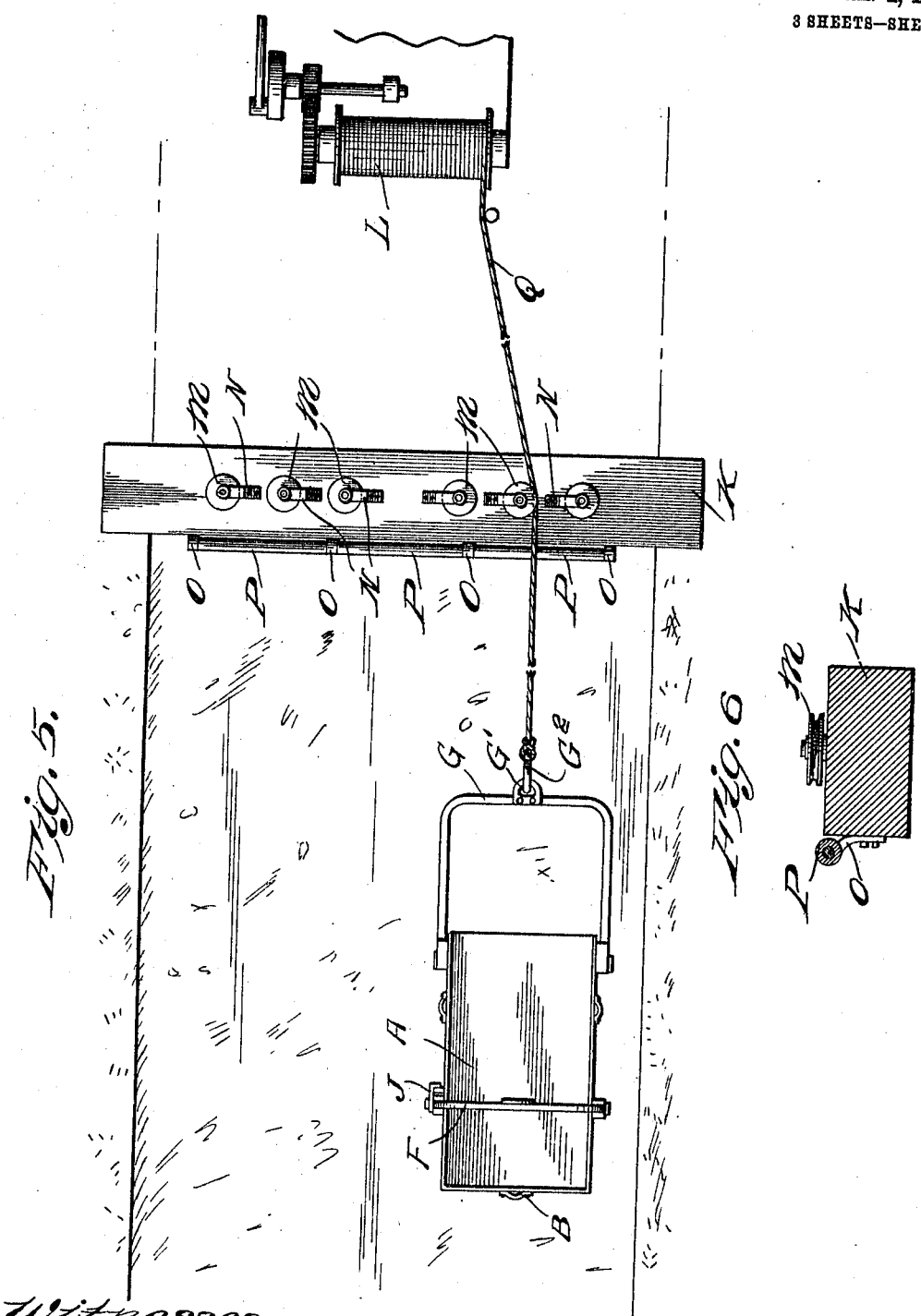

UNITED STATES PATENT OFFICE.

JEFFREY J. PRENDERGAST, OF ST. LOUIS, MISSOURI.

EXCAVATING APPARATUS.

945,414.  Specification of Letters Patent.  Patented Jan. 4, 1910.

Application filed September 18, 1908. Serial No. 453,659.

*To all whom it may concern:*

Be it known that I, JEFFREY JOSEPH PRENDERGAST, a citizen of the United States, residing in the city of St. Louis and State of Missouri, have invented new and useful Improvements in Excavating Apparatus, of which the following is a specification.

This invention relates to certain new and useful improvements in excavating apparatus, and particularly to improvements in and relating to a bucket or scoop for use in road work, ditch work, or the like.

The object of the invention is to provide a scoop which may be readily and easily operated; to provide means, coöperating with the scoop, whereby it may be made to take hold, or cut into the soil at the desired point, and at the requisite depth required; and to provide means for guiding the scoop whereby it may be caused to excavate along different lines without moving any of the operating machinery. The objects are attained by providing the scoop with two bails, one of which I denominate the draft-bail, and the other the carrying bail, the latter being provided with means whereby it may be locked in fixed relation to the scoop; by providing on the rear end of the scoop a suitable lug to which an implement is applied while the scoop is being hauled over the ground, to raise the rear of the scoop and thereby cause the front end to cut into the ground; and by providing means, in advance of the scoop, for directing the line of draft of the hauling cable.

The invention is illustrated in the accompanying drawings, in which:

Figure 1 is a plan view of a scoop provided with my improvements, and showing the lifting implement applied thereto in position to be operated; Fig. 2 is a view in side elevation of the same parts; Fig. 3 shows the scoop with its rear end elevated and with the draft-bail and carrying-bail connected to their respective cables; Fig. 4 shows the position of the parts when the carrying-bail has been released to permit the scoop to dump its contents; Fig. 5 is a plan view illustrating the manner of guiding the scoop to cause it to excavate along different lines; and Fig. 6 is a cross sectional view through the guide beam.

Referring now to the drawings, A indicates the scoop, which is of the usual construction and need not be described. Pivotally connected toward the front end of this scoop, and near the bottom thereof, is a draft-bail G, that is provided with an eye G′ into which is inserted the hook G² of the hauling cable. The draft-bail G is entirely independent of the carrying-bail hereinafter referred to, and is used only for the purpose of dragging the scoop over the ground.

The carrying-bail F is pivotally connected to the scoop toward the rear and bottom thereof, and is provided with an eye F′ for receiving the hook F² of the supporting cable. Bail F is also provided with a pivoted catch J for engagement with a lug I on the side of the scoop whereby the scoop is prevented from tilting or dumping its contents until the catch is released. The carrying-bail F is so positioned on the scoop that the latter will be only slightly overbalanced toward its end when filled with dirt.

To the center of the rear end of the scoop and near the bottom thereof I provide a lug B. This lug is adapted to be engaged by a snout E on a lifting implement, which comprises a handle D, in one end of which is inserted a heavy iron frame or bail D′ having parallel side walls in which is mounted the axle of a wheel C. The bail D′ is of iron or steel and its forward end is projected outward to form the snout E.

By referring to Fig. 3 the manner of using this implement will be readily apparent. The attendant places the snout E under the lug B and presses down on the outer end of the handle D and elevates the rear end of the scoop the desired height, which causes the front end to cut into the ground the desired depth, the scoop being moved along by the draft of the cable having the hook G². The attendant walks behind the scoop holding the handle D depressed and the snout E in engagement with the lug B, which operation requires slight exertion owing to the great leverage afforded by the implement and also to the provision of the wheel C for supporting the weight of the implement, and which, having as shown by Fig. 1 a broad rim passes easily over the ground, even where the same is very rough. When the scoop has been filled, the hook G² is removed from the draft-bail, the hook F² is inserted in the eye F′ of the carrying-bail F and the scoop carried by the supporting-cable to the point of discharge, when, by disengaging the catch J from the lug I, the scoop will automatically dump its contents, as will be clearly apparent by referring to Fig. 4.

As far as I am aware, scoops adapted for operation in the manner hereinafter described have been supported by two bails connected together, necessitating considerable trouble in manipulating the scoop in the various operations of hauling, elevating, carrying and dumping. It will be seen that according to my invention the front, or draft-bail, is entirely independent of the carrying-bail, which latter alone supports the scoop in all of the operations. By this means I increase to a large extent the rapidity with which the scoop may be operated under all conditions. The means for elevating the rear end of the scoop is also of great importance, as it expedites to a very marked degree the work of excavating by this device.

In operation, the scoop is pulled forward by the draft cable from a stationary engine located a suitable distance in advance of the work, and it therefore becomes necessary to provide means for guiding the scoop so that it may be caused to excavate along different lines. To this end I employ the device now to be described.

K indicates a beam of wood, which is placed at right-angles to the line of excavation and extends from side to side thereof. This beam, which I term a "guide-beam" is located between the winding-drum L of a stationary engine and the place of excavation. The guide-beam is preferably rectangular in cross-section, and is provided at suitable intervals on its top side with a number of guide-pulleys M, an equal number of pulleys being disposed on opposite sides of the center of the guide-beam, and the two sets of pulleys facing in opposite directions. Keepers N bolted to the guide-beam provide at their raised free ends a bearing for one end of the journals of the pulleys the opposite end being suitably journaled in the guide-beam.

O indicates bearings, which support the ends of rollers P at the upper edge of the guide-beam, in order to reduce the friction which would be caused by the hauling-cable Q passing over the guide-beam. It will be seen that by passing the hauling-cable Q over one or the other of the pulleys M the scoop A may be caused to excavate along different lines as it is pulled forward by winding the hauling cable on the drum L, so that the scoop may be caused to excavate over the entire width of the ditch. Both the stationary engine operating the winding drum L and the guide-beam K are moved forward from time to time as the work progresses.

I claim:

1. Excavating apparatus comprising a scoop having a draft-bail and a carrying-bail, and means for locking the latter to the scoop.

2. Excavating apparatus comprising a scoop having a draft-bail toward its forward end and a carrying-bail toward its rear end, the latter bail forming the sole support of the scoop, and means for locking said bail to the scoop.

3. Excavating apparatus comprising a scoop provided with means whereby it may be hauled over the ground, and a wheeled implement adapted for engagement with and elevation of the rear end of the scoop, and to maintain such elevation during the forward movement of the scoop.

4. Excavating apparatus comprising a scoop having means whereby it may be hauled over the ground and provided at its rear end with a lug, in combination with an implement having mounted near one end thereof a wheel, and provided in advance of said wheel with a snout for engagement with said lug.

5. Excavating apparatus comprising a scoop provided with means whereby it may be hauled over the ground and with independent supporting means, and a wheeled implement adapted to elevate the rear end of said scoop and to maintain the rear end of the scoop in such elevated position during the forward movement of the scoop.

6. Excavating apparatus comprising a scoop, a cable therefor, a hauling device for said cable located in advance of the scoop, a guide beam located between the hauling device and the scoop and extending transversely to the line of draft, and provided at certain intervals with a number of relatively fixed guides, any one of which may receive the cable for determining the line of draft thereof.

7. Excavating apparatus comprising a scoop, a cable for pulling said scoop forward, and a guide-beam located in advance of the scoop and having pulleys thereon at intervals throughout its length for receiving said cable, whereby the direction of movement of said scoop may be changed by placing the cable over one or the other of said pulleys.

8. Excavating apparatus comprising a scoop, a cable for pulling said scoop forward, a guide-beam located in advance of the scoop and having pulleys thereon at intervals throughout its length for receiving said cable, whereby the direction of movement of said scoop may be changed by placing the cable over one or the other of said pulleys, and anti-friction rollers for supporting said cable mounted on the guide-beam.

In testimony whereof I have hereunto set my hand in presence of two subscribing witnesses.

JEFFREY J. PRENDERGAST.

Witnesses:
C. S. GANNON,
J. P. KING.